(12) United States Patent
Takahashi

(10) Patent No.: US 10,424,124 B2
(45) Date of Patent: Sep. 24, 2019

(54) EDITING DEVICE FOR THREE-DIMENSIONAL SHAPE DATA, AND NON-TRANSITORY COMPUTER READABLE MEDIUM STORING THREE-DIMENSIONAL SHAPE-DATA EDITING PROGRAM

(71) Applicant: FUJI XEROX CO., LTD., Tokyo (JP)

(72) Inventor: Tomonari Takahashi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/890,834

(22) Filed: Feb. 7, 2018

(65) Prior Publication Data

US 2018/0330552 A1 Nov. 15, 2018

(30) Foreign Application Priority Data

May 10, 2017 (JP) .................. 2017-094309

(51) Int. Cl.
*G06T 19/20* (2011.01)

(52) U.S. Cl.
CPC .......... *G06T 19/20* (2013.01); *G06T 2200/24* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| 5,428,715 A * | 6/1995 | Suzuki | G05B 19/4097 345/419 |
| 6,069,634 A | 5/2000 | Gibson | |
| 8,576,222 B2 * | 11/2013 | Handley | G06F 3/016 345/419 |
| 2004/0174359 A1 * | 9/2004 | Takagi | G06T 17/10 345/420 |
| 2005/0151734 A1 * | 7/2005 | Gubkin | G06T 15/08 345/424 |
| 2006/0109269 A1 * | 5/2006 | Jennings, Jr. | G06T 19/20 345/424 |
| 2006/0159346 A1 * | 7/2006 | Lakare | G06T 7/0012 382/206 |

(Continued)

FOREIGN PATENT DOCUMENTS

FR 2674048 A1 9/1992
JP 07-210584 A 8/1995

(Continued)

OTHER PUBLICATIONS

Extended European Search Report dated May 17, 2018 issued by the European Patent Office in counterpart application No. 18160375.4.

*Primary Examiner* — Ryan M Gray
(74) *Attorney, Agent, or Firm* — Sughrue Mion, PLLC

(57) ABSTRACT

An editing device for three-dimensional shape data includes: a two-dimensional region setter that sets a two-dimensional region on a two-dimensional plane, on which a three-dimensional shape represented by three-dimensional shape data is projected; and an initial edit range setter that sets a three-dimensional initial edit range in a depth direction of the two-dimensional region set by the two-dimensional region setter.

12 Claims, 11 Drawing Sheets

(56) References Cited

U.S. PATENT DOCUMENTS

| | | | |
|---|---|---|---|
| 2008/0225044 A1* | 9/2008 | Huang | G06T 17/00 345/420 |
| 2013/0235038 A1* | 9/2013 | Tkacheff | G06T 17/00 345/424 |
| 2016/0012647 A1* | 1/2016 | Chen | G01V 5/0008 382/203 |
| 2016/0267705 A1* | 9/2016 | O'Leary | G06F 3/04815 |
| 2018/0108184 A1* | 4/2018 | Takahashi | G06T 19/20 |

FOREIGN PATENT DOCUMENTS

| | | |
|---|---|---|
| JP | 10-208078 A | 8/1998 |
| JP | 2009-162597 A | 7/2009 |
| JP | 2010-231620 A1 | 10/2010 |
| JP | 2012-088771 A | 5/2012 |

\* cited by examiner

EDITING DEVICE FOR THREE-DIMENSIONAL SHAPE DATA, AND NON-TRANSITORY COMPUTER READABLE MEDIUM STORING THREE-DIMENSIONAL SHAPE-DATA EDITING PROGRAM

CROSS-REFERENCE TO RELATED APPLICATIONS

This application is based on and claims priority under 35 USC 119 from Japanese Patent Application No. 2017-094309 filed on May 10, 2017.

BACKGROUND

Technical Field

The present invention relates to an editing device for three-dimensional shape data, and a non-transitory computer readable medium storing a three-dimensional shape-data editing program.

SUMMARY

According to an aspect of the invention, there is provided an editing device for three-dimensional shape data including: a two-dimensional region setter that sets a two-dimensional region on a two-dimensional plane, on which a three-dimensional shape represented by three-dimensional shape data is projected; and an initial edit range setter that sets a three-dimensional initial edit range in a depth direction of the two-dimensional region set by the two-dimensional region setter.

BRIEF DESCRIPTION OF THE DRAWINGS

Exemplary embodiments of the present invention will be described in detail based on the following figures, wherein.

DETAILED DESCRIPTION

Hereinafter, an exemplary embodiment for carrying out the present invention will be described in detail with reference to the drawings.

Figure 1:
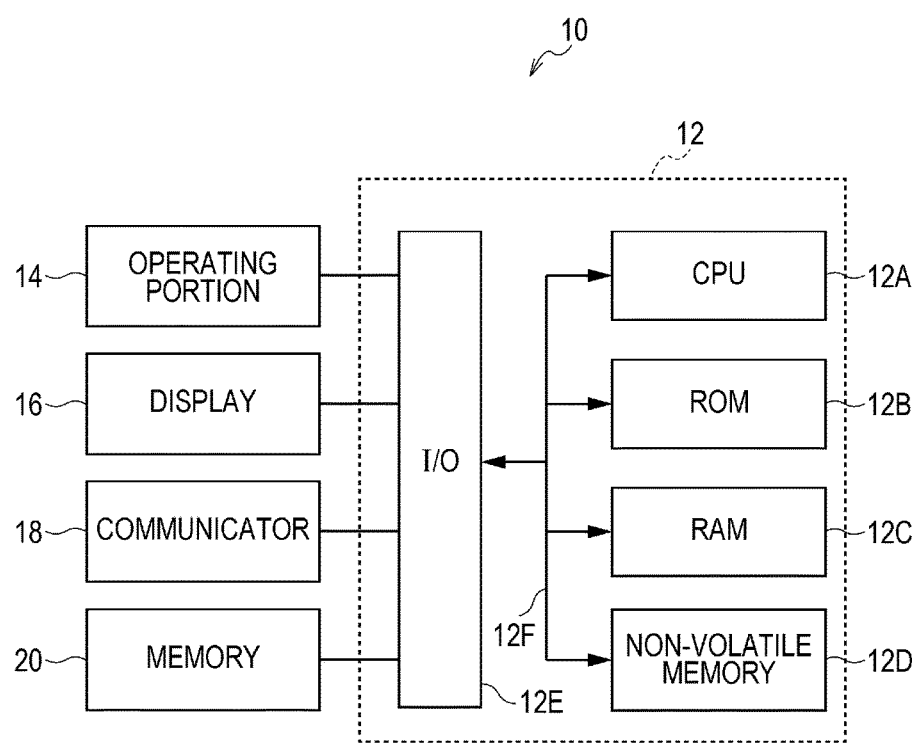
FIG. 1 is a diagram illustrating a configuration example of an editing device for three-dimensional shape data.

First, referring to FIG. 1, the configuration of an editing device 10 for three-dimensional shape data according to the exemplary embodiment will be described.

The editing device 10 is configured by, for instance, a personal computer, and includes a controller 12. The controller 12 includes a central processing unit (CPU) 12A, a read only memory (ROM) 12B, a random access memory (RAM) 12C, a non-volatile memory 12D, and an input/output (I/O) interface 12E. The CPU 12A, the ROM 12B, the RAM 12C, the non-volatile memory 12D, and the I/O 12E are connected to each other via a bus 12F.

Also, the I/O 12E is connected to an operating portion 14, a display 16, a communicator 18, and a memory 20. It is to be noted that the CPU 12A is an example of a two-dimensional region setter, an initial edit range setter, and a changer.

The operating portion 14 includes an input device, such as a mouse, a keyboard, or a touch panel, that receives an instruction from a user of the editing device 10, for instance.

The display 16 includes a display device such as a liquid crystal display and an organic electro luminescence (EL) display, for instance.

The communicator 18 is connected to a communication line, for instance, the Internet or a local area network (LAN), and has an interface for performing data communication with an external device such as a personal computer connected to the communication line.

The memory 20 includes a non-volatile memory device such as a hard disk, and stores the later-described editing program for three-dimensional shape data, and three-dimensional shape data to be edited. The CPU 12A reads and executes the editing program for three-dimensional shape data stored in the memory 20.

Figure 2:
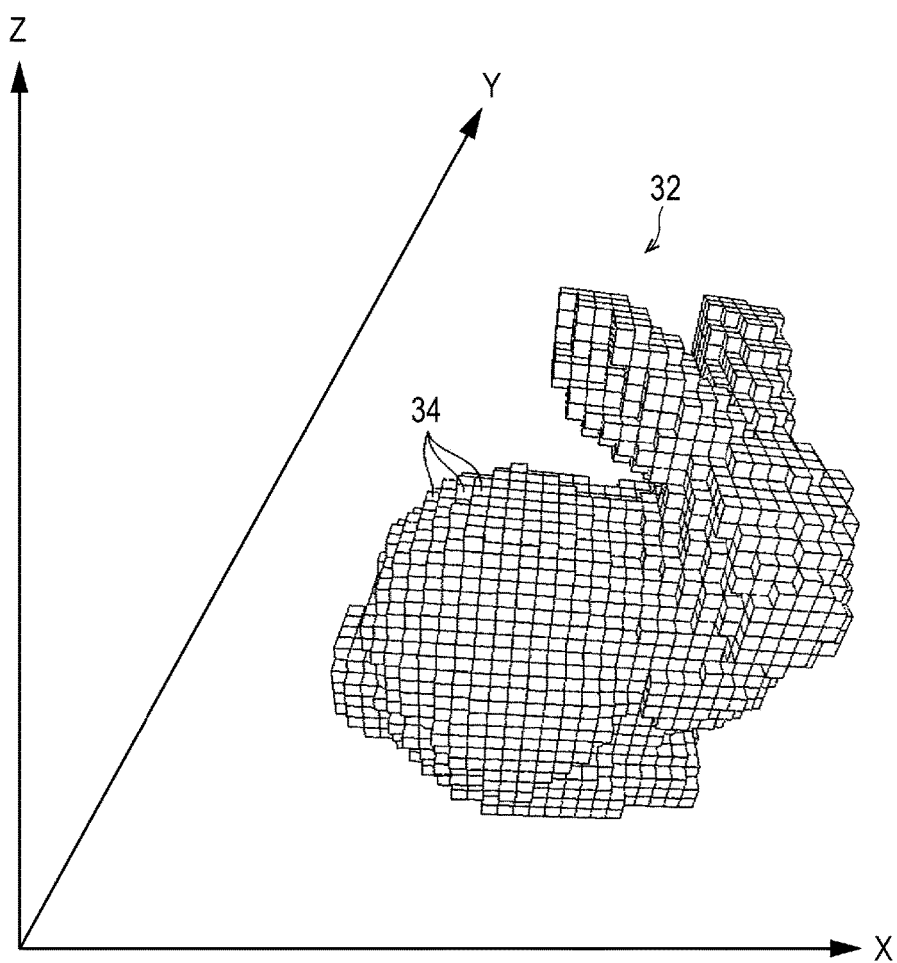
FIG. 2 is a diagram illustrating an example of a three-dimensional shape.

FIG. 2 is a diagram illustrating an example of a three-dimensional shape 32 indicated by three-dimensional shape data. As illustrated in FIG. 2, the editing device 10 represents the three-dimensional shape 32 using the three-dimensional coordinate space formed by X-axis, Y-axis, and Z-axis that are perpendicular to each other.

In this exemplary embodiment, a description is given for the case where as a data format for three-dimensional shape data, the data format that represents the three-dimensional shape 32 by a set of voxels 34 is used. However, other data formats may be used.

Here, the voxels 34 are basic elements of the three-dimensional shape 32, and for instance, a rectangular parallelepiped is used. However, without being limited to a rectangular parallelepiped, a sphere or a cylinder may be used. A desired three-dimensional shape 32 is represented by stacking the voxels 34. Also, for each voxel 34, an attribute indicating a property of the voxel 34, for instance, a color, a strength, a material quality, or a texture is specified, and the color or the material quality of the three-dimensional shape 32 is represented by presence of the voxel 34 and the attribute of the voxel 34.

Here, the "material quality" includes at least one of information indicating a genre of material such as resin, metal, or rubber, information indicating a material name such as ABS, PLA, information indicating a product name, a product number of a commercially available material, information indicating a material such as a material name an abbreviation, and a number which are defined in a standard such as ISO, JIS, and information indicating material characteristics such as a thermal conductivity, an electrical conductivity, and magnetism.

Furthermore, the "texture" also includes an attribute indicating not only a color, but also appearance or touch of three-dimensional shape data, in addition to a reflectivity, a transmittance, gloss, and a surface property thereof.

It is to be noted that the attribute includes an attribute pattern which is set using at least one of a period, an expression, and another three-dimensional shape data. The attribute pattern includes at least one of repeat of a constant period, gradation, representation by a slope or a local point expressed by an expression, continuous modification of the color, material quality, or texture of three-dimensional shape data in accordance with another three-dimensional shape data, and filling or continuously modifying a specified range of three-dimensional shape data with a specified pattern.

As described above, the three-dimensional shape 32 is represented by a set of voxels 34, and specifically is represented by, for instance, an element value of X, Y, Z coordinates in a three-dimensional coordinate space. Let (X, Y, Z) represent coordinates in a three-dimensional coordinate space, then when a voxel 34 is present at the coordinates (X, Y, Z), "(X, Y, Z)=1" is set, whereas when a voxel 34 is not present at the coordinates (X, Y, Z), "(X, Y, Z)=0" is set, and the three-dimensional shape 32 is thereby represented. In other words, three-dimensional shape data includes the element value of the coordinates (X, Y, Z), which indicates the presence or absence of the voxel 34, and an attribute associated with the voxel 34 having an element value of "1".

It is to be noted that the three-dimensional shape 32 is not necessarily represented by coordinates (X, Y, Z) in a three-dimensional coordinate space. For instance, the three-dimensional shape 32 may be represented by index numbers each uniquely associated with coordinates (X, Y, Z). In this case, for instance when the value associated with an index number is "1", this means that a voxel 34 is present at the position indicated by the index number.

In addition, no restriction is imposed on the shape of the three-dimensional shape 32, and the three-dimensional shape 32 may have any shape as long as the shape is represented by using three-dimensional shape data.

Figure 3:
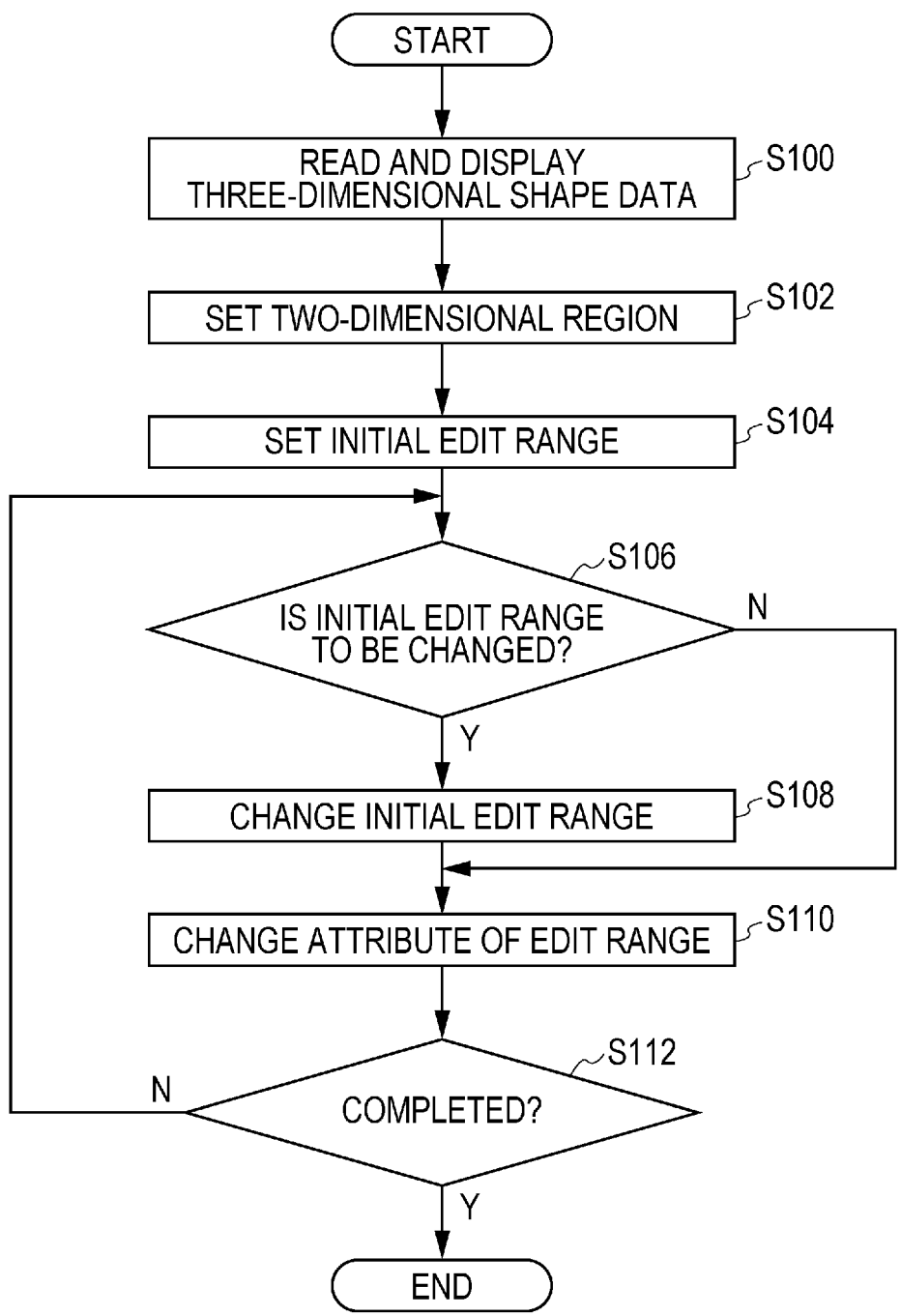
FIG. 3 is a flowchart illustrating an example of a flow of edit processing of three-dimensional shape data.

Next, the operation of the editing device 10 according to the exemplary embodiment will be described with reference to FIG. 3. The CPU 12A reads and executes the editing program for three-dimensional shape data, thereby performing the edit processing illustrated in FIG. 3. It is to be noted that the edit processing illustrated in FIG. 3 is performed, for instance when execution of the editing program is instructed by an operation of a user.

In step S100, three-dimensional shape data to be edited is read from the memory 20, and displayed on the display 16. Consequently, a two-dimensional shape is displayed, which is a projection of a three-dimensional shape represented by three-dimensional shape data on the display 16 as a two-dimensional plane.

Figure 4:
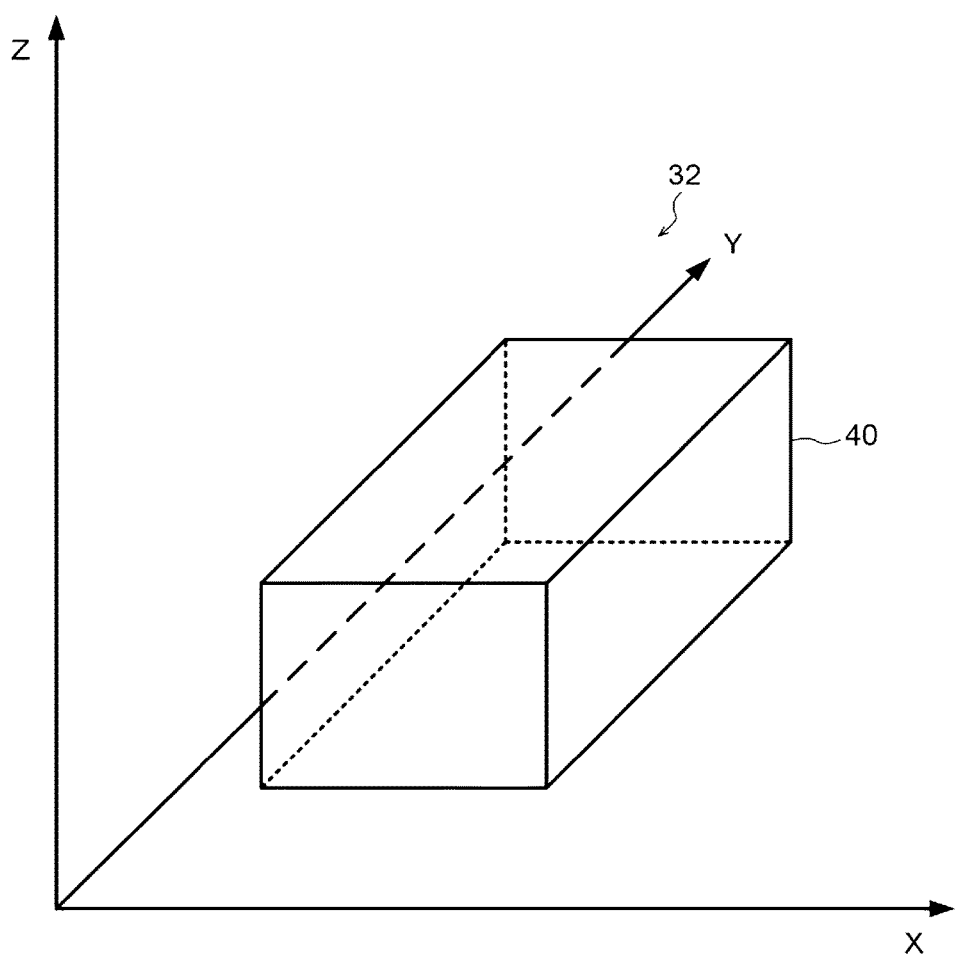
FIG. 4 is a perspective view illustrating an example of a three-dimensional shape.
Figure 5:
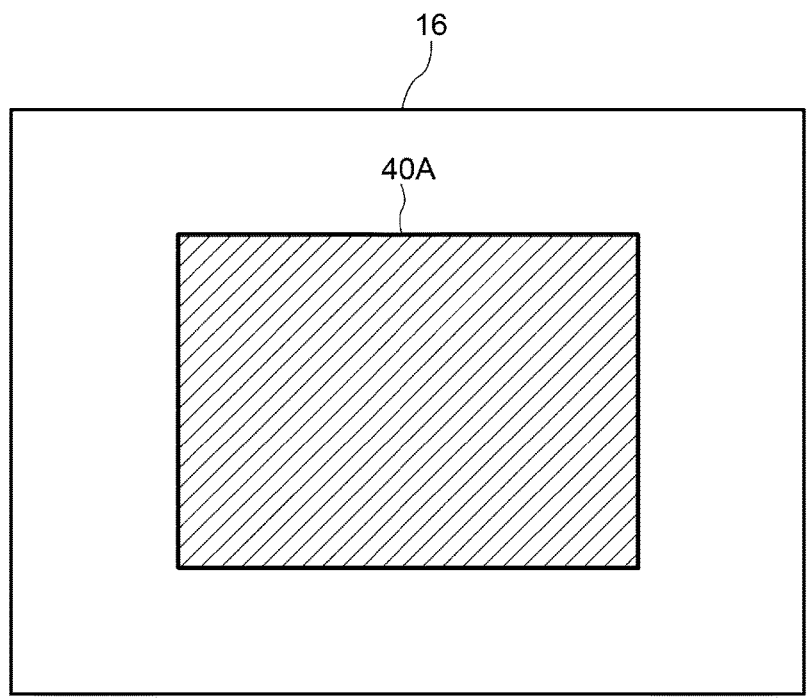
FIG. 5 is a diagram for explaining the setting of a two-dimensional region.

In this exemplary embodiment, for the sake of simplicity of description, for instance, a case will be described where a three-dimensional shape represented by three-dimensional shape data to be edited is a rectangular parallelepiped three-dimensional shape 40 as illustrated in FIG. 4, and as illustrated in FIG. 5, the two-dimensional shape 40A, which is a parallel projection or a perspective projection of the three-dimensional shape 40 to the current viewpoint position in 3D space, is displayed on the display 16. It is to be noted that the viewpoint can be changed up to 360 degrees by a user operating the operating portion 14, and a two-dimensional shape, which is a projection of the three-dimensional shape 40 on any two-dimensional plane with various angles, can be displayed.

In step S102, a two-dimensional region to be edited is set in the two-dimensional shape 40A displayed on the display 16. Specifically, a user sets a two-dimensional region which is desired to be edited by operating the operating portion 14 while referring to the two-dimensional shape 40A displayed on the display 16. It is to be noted that "two-dimensional region" is a region that is represented by one of points, a rectangle, a circle, and a closed curve, for instance.

Here, the "edit" includes modification of at least part of a three-dimensional shape 40 by performing processing such as deformation, enlargement, reduction, movement, rotation, addition, deletion, replacement, and composition, on the at least part of the three-dimensional shape 40.

Also, the "edit" includes modification of an attribute of at least part of a three-dimensional shape 32 by performing processing such as addition, deletion, modification, substitution, and composition on at least part of at least one attribute of color, strength, material quality, and texture assigned to three-dimensional position information.

Figure 6:
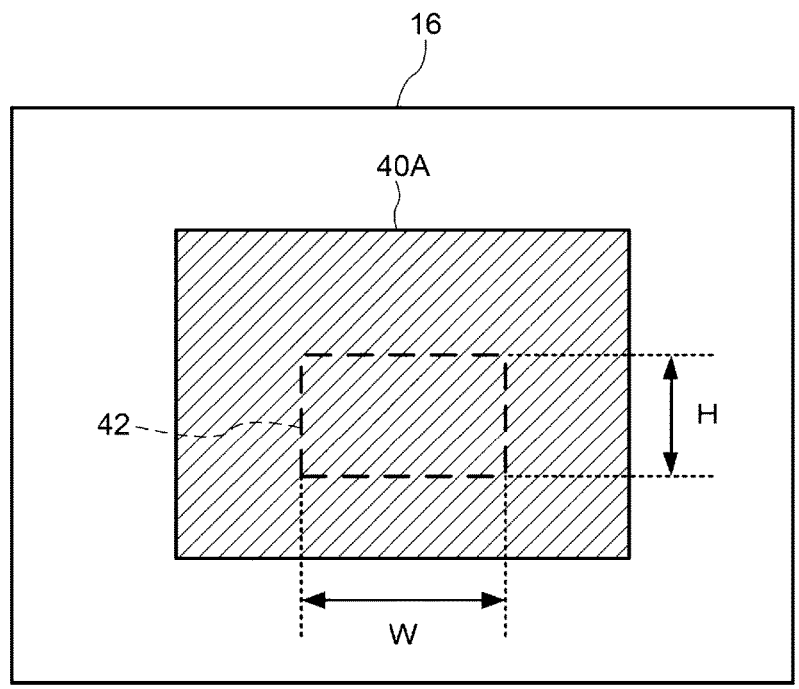
FIG. 6 is a diagram for explaining the setting of a two-dimensional region.

In step S104, a three-dimensional initial edit range is set in a depth direction of the two-dimensional region set in step S102. For instance, a case will be described where the two-dimensional region set in step S102 by a user is a two-dimensional region 42 as illustrated in FIG. 6.

Figure 7:
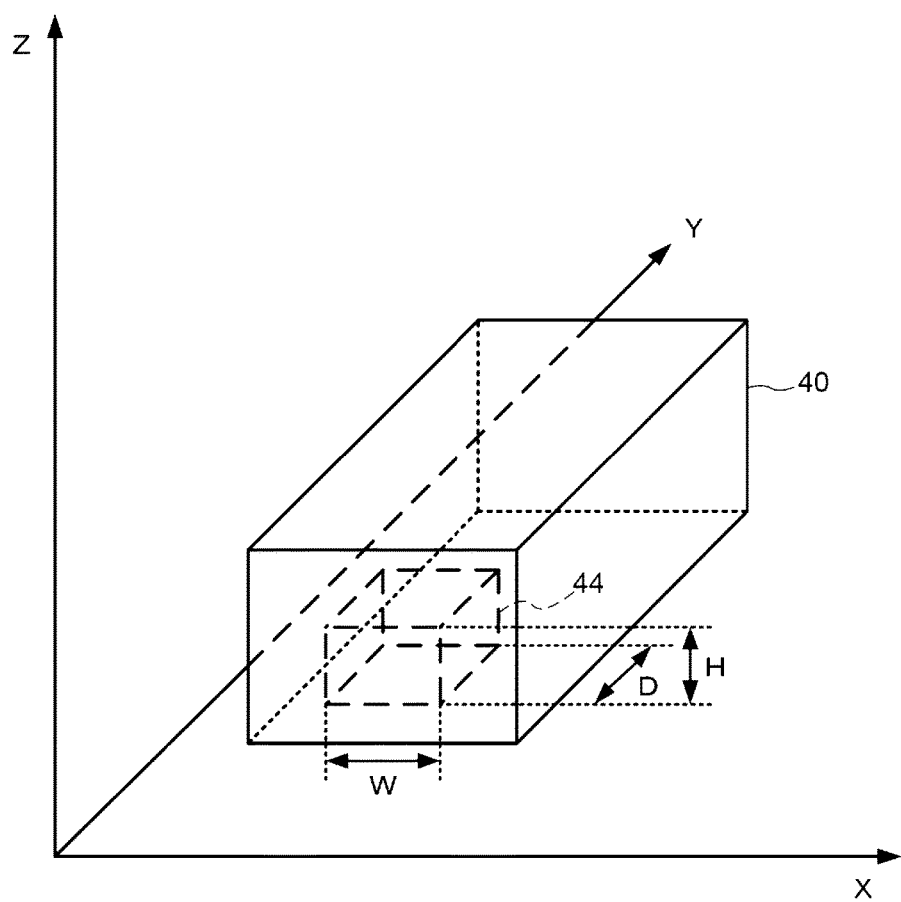
FIG. 7 is a perspective view illustrating an example of an initial edit range.

In this case, the length of the initial edit range in depth is set based on the vertical length and the horizontal length of the two-dimensional region 42, for instance. For instance, as illustrated in FIG. 6, when the heightwise length (the length in the Z-axis direction) of the two-dimensional region 42 is denoted by H and the widthwise length (the length in the X-axis direction) of the two-dimensional region 42 is denoted by W, a depth length D is set to the longer one between H and W. In the example of FIG. 6, since W>H, the depth length D is set to the widthwise length W. Thus, a three-dimensional initial edit range 44 is set as illustrated in FIG. 7. Here, the initial edit range 44 is represented by a shape formed by a set of voxels.

It is to be noted that the depth length D may be set to the shorter one between the heightwise length H and the widthwise length W of the two-dimensional region 42. Also, when the heightwise length H and the widthwise length W are the same, the depth length D may be same as the heightwise length H and the widthwise length W. Alternatively, the depth length D may be set to a value determined by performing predetermined calculation on the heightwise length H and the widthwise length W, such as multiplying the heightwise length H and the widthwise length W by a predetermined coefficient.

Figure 8:
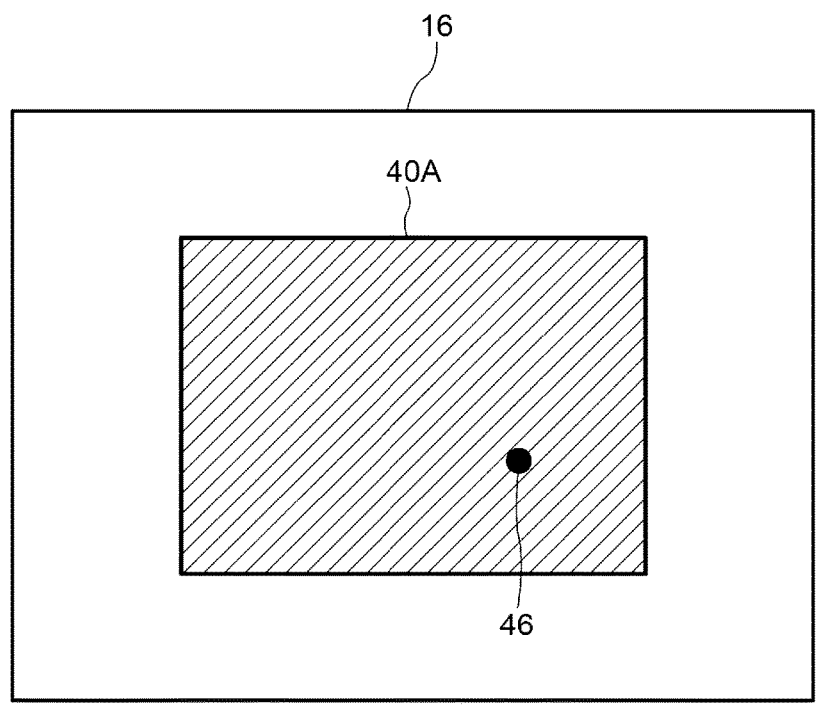
FIG. 8 is a diagram for explaining a modification example of setting of a two-dimensional region.
Figure 9:
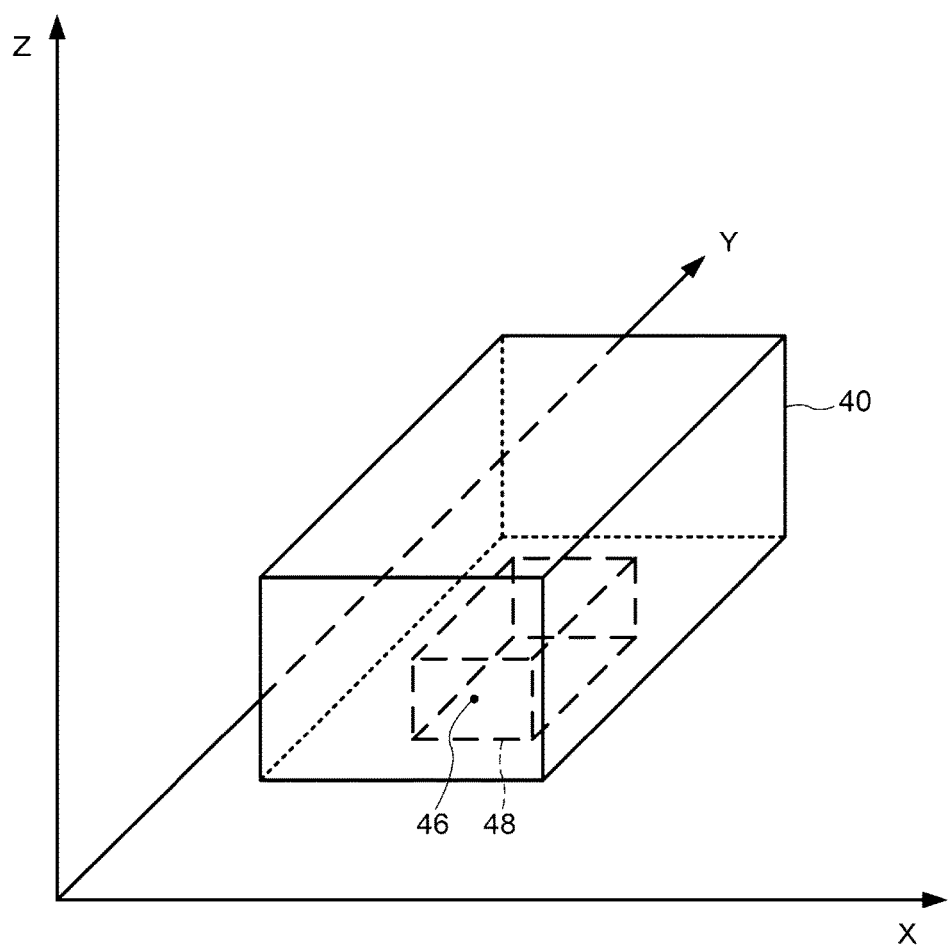
FIG. 9 is a perspective view illustrating a modification example of an initial edit range.

Also, a user may specify a two-dimensional region to be edited by a point. In this case, a three-dimensional initial edit range may be set based on a three-dimensional shape including the specification point. For instance, as illustrated in FIG. 8, when a user specifies a point 46, a similar shape 48 as illustrated in FIG. 9, similar to the three-dimensional shape 40 including the point 46, may be set as the initial edit range.

Figure 10:
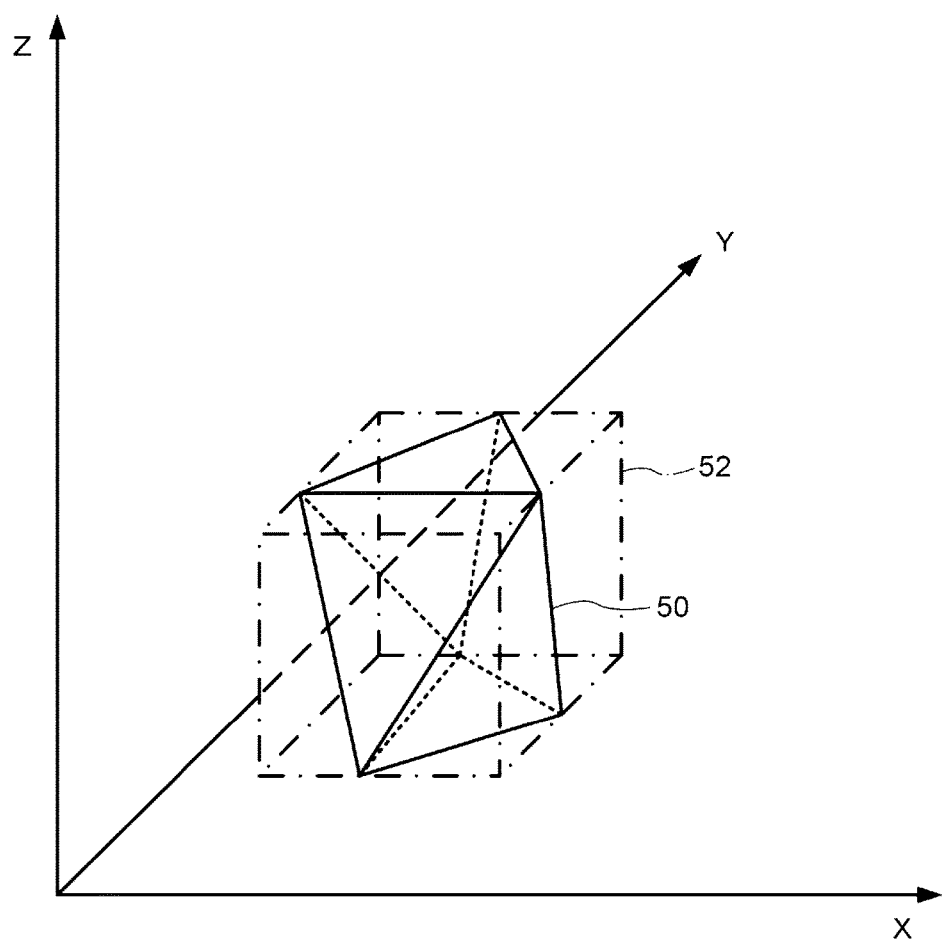
FIG. 10 is a diagram for explaining a bounding box.

Alternatively, an initial edit range may be set based on a rectangular parallelepiped shape including the three-dimensional shape. The rectangular parallelepiped shape including the three-dimensional shape refers to a rectangular bounding box having a size necessary for including the three-dimensional shape, for instance. For instance, as illustrated in FIG. 10, when the three-dimensional shape to be edited is a polyhedron 50, a bounding box 52 having a size necessary for including the polyhedron 50 is called for. For instance, when a user specifies a point in the two-dimensional shape of the polyhedron 50 displayed on the display 16, the initial edit range is a rectangular parallelepiped similar to the bounding box 52 of the polyhedron 50. The size of the initial edit range may have a predetermined ratio to the size of the bounding box 52, or may be specified by a user.

In step S106, it is determined whether or not an instruction for changing the initial edit range has been provided. Specifically, it is determined whether or not an instruction for changing the initial edit range set in step S104 has been provided by a user operating the operating portion 14. When an instruction for changing the initial edit range has been provided, the flow proceeds to step S108, and when an instruction for changing the initial edit range has not been provided, the flow proceeds to step S112.

In step S108, the initial edit range is changed according to an operation of a user. In the initial edit range, for instance, at least one of the position, the size, the angle, and the shape of the initial edit range is changeable based on the position of the voxels.

Figure 11:
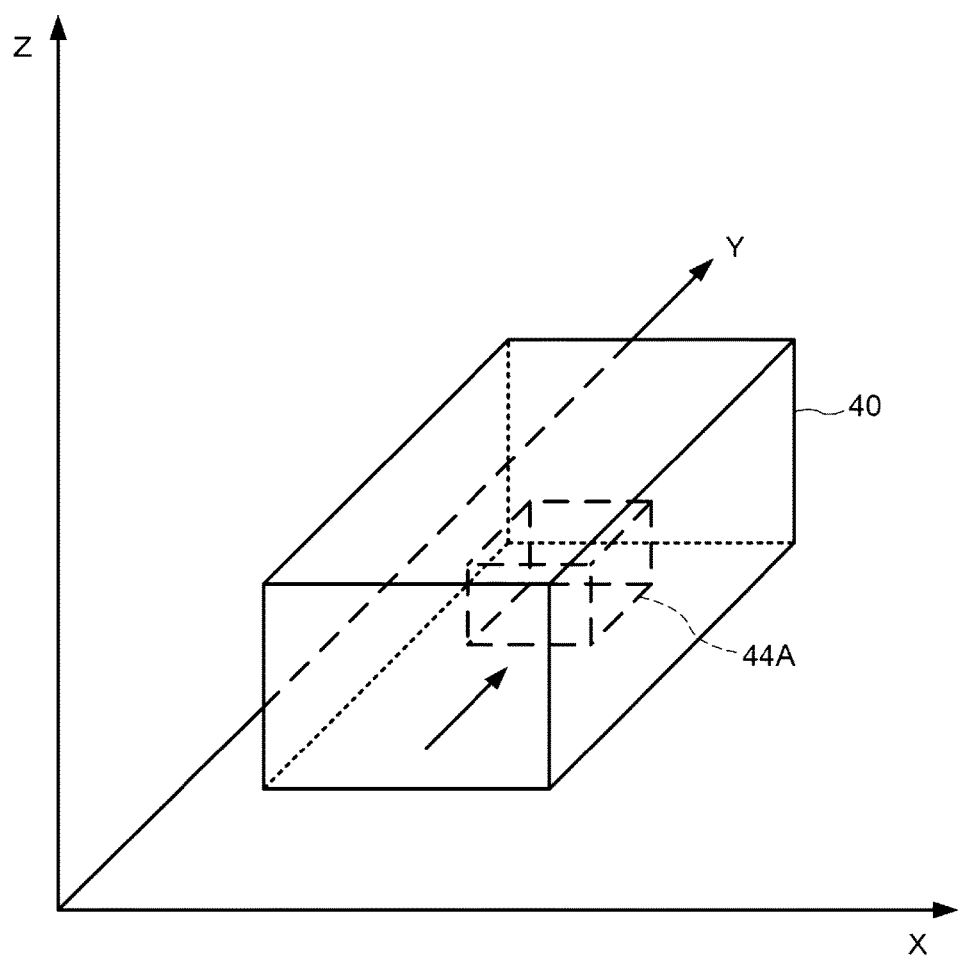
FIG. 11 is a diagram for explaining change of the position of an initial edit range.

For instance, the position of the initial edit range is changeable to a position inside the three-dimensional shape. For instance, the position of the initial edit range 44 first set as illustrated in FIG. 11 is moved in the Y-axis direction by a user operating the operating portion 14, and the initial edit range 44 is thereby moved to the inside of the three-dimensional shape 40 and is denoted as an edit range 44A. Similarly, by operating the operating portion 14, the angle of the initial edit range 44 can be changed by rotating the initial edit range 44 around one of the X, Y, and Z-axes of the world coordinate system which is a coordinate system for the entire three-dimensional space, or a local coordinate system used for handling the initial edit range. Similarly, the size of the initial edit range 44 can be changed by enlarging or reducing the initial edit range 44 along one of the X, Y, and Z-axes of the world coordinate system or the local coordinate system.

When the shape of the initial edit range is changed, the shape is changed by performing at least one of processing of deleting the voxels in part of the initial edit range and processing of adding voxels to the initial edit range. Also, the shape of the initial edit range may be automatically converted to the shape formed by a set of voxels by deleting part of the voxels or adding some voxels.

In step S110, the edit range is edited. Here, when the initial edit range is changed in step S108, the edit range indicates an edit range after the initial edit range is changed, and when the initial edit range is not changed, the edit range indicates the initial edit range set in step S104. A user edits the edit range by changing an attribute such as the color the voxels in the edit range by operating the operating portion 14.

In step S112, it is determined whether or not an operation for instructing completion is performed. When an instruction for completion is provided, the routine is exited, and when an instruction for completion is not provided, the flow returns to step S106 and the above-described processing is repeated.

In this manner, in this exemplary embodiment, a two-dimensional region on a two-dimensional plane is set on which a three-dimensional shape represented by three-dimensional shape data is projected, and a three-dimensional initial edit range is set in a depth direction of the set two-dimensional region. Consequently, it is not necessary to specify the length in the depth direction by a user operating the operating portion 14, and thus an initial edit range is set by a simple operation.

Although the present disclosure has been described above using the exemplary embodiment, the present disclosure is not limited to the scope of the exemplary embodiment. Various modifications or improvements may be made to the exemplary embodiment without departing from the gist of the present disclosure, and the exemplary embodiment to which the modifications or improvements are made is also included in the technical scope of the present disclosure.

For instance, the edit processing of three-dimensional shape data illustrated in FIG. 3 may be implemented by hardware such as an application specific integrated circuit (ASIC). In this case, faster processing is achieved as compared with the case where the edit processing is implemented by software.

Also, in the exemplary embodiment, although a case has been described where the editing program for three-dimensional shape data is installed in the ROM 12B, the exemplary embodiment is not limited to this. The editing program for three-dimensional shape data according to the exemplary embodiment may be provided in the form of computer readable medium. For instance, the editing program according to the exemplary embodiment may be provided in the form of recording in an optical disk such as a compact disc (CD)-ROM and a digital versatile disc (DVD)-ROM or in a semiconductor memory such as a universal serial bus (USB) memory and a memory card. Also, the editing program for three-dimensional shape data according to the exemplary embodiment may be obtained from an external device via a communication line connected to the communicator 18.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An editing device comprising:
at least one processor configured to execute:
  a two-dimensional region setter that sets a two-dimensional region on a two-dimensional plane, on which a three-dimensional shape represented by three-dimensional shape data is projected; and
  an initial edit range setter that sets a three-dimensional initial edit range in a depth direction of the two-dimensional region set by the two-dimensional region setter,
wherein the initial edit range setter sets a length of the initial edit range in the depth direction using a heightwise length and a widthwise length of the two-dimensional region.

2. The editing device according to claim 1, wherein the initial edit range setter sets the initial edit range using a three-dimensional shape in a portion in which the two-dimensional region is set.

3. The editing device according to claim 1, wherein the initial edit range setter sets the initial edit range using a rectangular parallelepiped shape that includes the three-dimensional shape.

4. The editing device according to claim 2, wherein the initial edit range setter sets the initial edit range using a rectangular parallelepiped shape that includes the three-dimensional shape.

5. The editing device according to claim 1, wherein the at least one processor is further configured to execute:
a changer that changes at least one of a position, a size, an angle, and a shape of the initial edit range.

6. The editing device according to claim 2, wherein the at least one processor is further configured to execute:
   a changer that changes at least one of a position, a size, an angle, and a shape of the initial edit range.

7. The editing device according to claim 3, wherein the at least one processor is further configured to execute:
   a changer that changes at least one of a position, a size, an angle, and a shape of the initial edit range.

8. The editing device according to claim 4, wherein the at least one processor is further configured to execute:
   a changer that changes at least one of a position, a size, an angle, and a shape of the initial edit range.

9. The editing device according to claim 5, wherein the three-dimensional shape data is voxel data in which the three-dimensional shape is represented by a plurality of voxels, and
   the changer changes at least one of a position, a size, and an angle of the initial edit range using a position of the plurality of voxels.

10. The editing device according to claim 5, wherein the three-dimensional shape data is voxel data in which the three-dimensional shape is represented by a plurality of voxels, and
    the initial edit range is represented by a shape formed by a set of the plurality of voxels.

11. The editing device according to claim 5, wherein the three-dimensional shape data is voxel data in which the three-dimensional shape is represented by a plurality of voxels, and
    the changer changes a shape of an initial edit range by performing at least one of processing of deleting the voxels in part of the initial edit range and processing of adding voxels to the initial edit range which is represented by a shape formed by a set of the plurality of voxels.

12. A non-transitory computer readable medium storing a program that, when executed, causes a computer to execute a process comprising:
    setting a two-dimensional region on a two-dimensional plane, on which a three-dimensional shape represented by three-dimensional shape data is projected; and
    setting a three-dimensional initial edit range in a depth direction of the two-dimensional region set in the setting of a two-dimensional region,
    wherein the setting the three-dimensional initial edit range comprises setting a length of the initial edit range in the depth direction using a heightwise length and a widthwise length of the two-dimensional region.

* * * * *